(12) United States Patent
Wouhaybi et al.

(10) Patent No.: US 8,754,886 B2
(45) Date of Patent: Jun. 17, 2014

(54) SYSTEMS AND METHODS FOR TRANSPORTING PHYSICAL OBJECTS FROM REAL PHYSICAL LIFE INTO VIRTUAL WORLDS

(75) Inventors: Rita H. Wouhaybi, Hillsboro, OR (US); Mic Bowman, Beaverton, OR (US); Robert Knauerhase, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 183 days.

(21) Appl. No.: 12/317,737

(22) Filed: Dec. 29, 2008

(65) Prior Publication Data
US 2010/0164953 A1   Jul. 1, 2010

(51) Int. Cl.
  *G06T 17/00* (2006.01)
  *G06T 15/00* (2011.01)
(52) U.S. Cl.
  USPC .......................................... 345/420; 345/419
(58) Field of Classification Search
  USPC .................................... 345/419, 420
  See application file for complete search history.

(56) References Cited

U.S. PATENT DOCUMENTS

| | | | |
|---|---|---|---|
| 6,545,673 B1 | 4/2003 | Shiitani et al. | |
| 6,741,245 B1 | 5/2004 | Marks et al. | |
| 2002/0107674 A1 | 8/2002 | Bascle et al. | |
| 2002/0107679 A1 | 8/2002 | Roelofs | |
| 2005/0280534 A1* | 12/2005 | Navarro | 340/572.1 |
| 2006/0188132 A1 | 8/2006 | Shigeta | |
| 2007/0203971 A1* | 8/2007 | Walker et al. | 709/201 |
| 2009/0179734 A1 | 7/2009 | Do et al. | |
| 2010/0277723 A1* | 11/2010 | Rezac et al. | 356/301 |

FOREIGN PATENT DOCUMENTS

| | | |
|---|---|---|
| CN | 1657884 A | 8/2005 |
| CN | 1825915 A | 8/2006 |
| CN | 1970894 A | 5/2007 |
| CN | 101482879 A | 7/2009 |
| EP | 1271415 A1 | 4/2002 |
| EP | 1271415 A1 * | 1/2003 |
| EP | 2202608 A1 | 6/2010 |
| JP | H3-138758 A | 6/1991 |
| JP | 2000-259855 A | 9/2000 |
| JP | 2000306122 A | 11/2000 |
| JP | 2003-132373 A | 5/2003 |
| JP | 2004519034 A | 6/2004 |

(Continued)

OTHER PUBLICATIONS

Nishida, Y. et al. The surrounding sensor approach—application to sleep apnea syndrome diagnosis based on image processing. 1999. Systems, Man, Cybernetics, 1999, IEEE SMC '99 Conference Proceedings. vol. 6, pp. 382-388.*

(Continued)

*Primary Examiner* — James A Thompson
*Assistant Examiner* — Wynton S Jones
(74) *Attorney, Agent, or Firm* — Barnes & Thornburg LLP

(57) ABSTRACT

Systems and methods for transporting physical objects from real physical life into virtual worlds. Briefly stated, the method includes receiving characteristic and structure data from an object constructed in the real world. The characteristic and structure data is obtained from the object using a plurality of sensors placed in the vicinity of the object to sense the characteristics and structure of the object. The characteristic and structure data of the object is used to produce code necessary to create an equivalent representation of the object in a virtual world.

30 Claims, 11 Drawing Sheets

(56) References Cited

FOREIGN PATENT DOCUMENTS

| JP | 2004326384 A | 11/2004 |
|---|---|---|
| WO | 2012160055 A1 | 11/2012 |
| WO | 2012160057 A1 | 11/2012 |

OTHER PUBLICATIONS

European Search report received for European Patent Application No. 09252782.9, mailed on May 4, 2010, 4 pages.
Office action received for European Patent Application No. 09252782.9, mailed on May 31, 2010, 4 pages.
Anderson, et al., "Tangible interaction + Graphical Interpretation: A New Approach to 3D Modeling", xp-001003579,Computer Graphics, Proceeding Annual Conference Series, Jul. 2000, pp. 393-402.
Anderson, et al., "Building Virtual Structures With Physical Blocks", xp-001113175, Proceedings of the 12th annual ACM Symposium on User Interface Software & Technology, vol. 1, Nov. 7, 1999, pp. 71-72.
Gorbet, et al., "Triangles: Tangible interface for manipulation and exploration of digital information topography", xp-000780774, proceeding of SIGCHI Conference on Humaan Factors in Computer systems, 1998, pp. 49-56.
Office Action received for Chinese Patent Application No. 200910266821.9, mailed on Aug. 24, 2011, 3 pages of Office Action and 6 pages of unofficial English Translation.
Office Action received for Korean Patent Application No. 10-2009-130141, mailed on Mar. 18, 2011, 4 pages of Office Action and 3 pages of unofficial English Translation.
Office Action received in Chinese Patent Application No. 200910266821.9, mailed Jun. 5, 2012, 8 pages of Office Action, including 5 pages of English translation.
Office Action received for European Patent Application No. 09252782.9, mailed Jan. 18, 2012, 5 pages.
Office Action received for Japanese Patent Application No. 2009-293556, mailed Apr. 17, 2012, 1 page of Japanese Office Action and 2 pages of unofficial English summary translation.
Decision for Grant received for Japanese Patent Application No. 2009-293556, mailed Dec. 11, 2012, 1 page of Japanese Decision for Grant and 1 page of partial, unofficial English translation.
Office Action received for Chinese Patent Application No. 200910266821.9, mailed Feb. 5, 2013, 3 pages of Chinese Office Action and 5 pages of unofficial English translation.
Office Action received for European Patent Application No. 09252782.9, mailed Oct. 26, 2012, 7 pages.
Notice of Grant received for Chinese Patent Application No. 200910266821.9, mailed on Jul. 2, 2013, 6 pages of Chinese Notice of Grant and 2 pages of unofficial English translation.
Office Action received for Japanese Patent Application No. 2013-021811, mailed on Dec. 24, 2013, 2 pages of Japanese Office Action and 2 pages of unofficial English translation.
Office Action received for European Patent Application No. 09252782.9, mailed on Feb. 20, 2014, 5 pages.

* cited by examiner

Sensors self-organizing to detect a house

SYSTEMS AND METHODS FOR TRANSPORTING PHYSICAL OBJECTS FROM REAL PHYSICAL LIFE INTO VIRTUAL WORLDS

BACKGROUND OF THE INVENTION

1. Field of the Invention

The present invention is generally related to visual computing. More particularly, the present invention is related to the ability to transport modular physical objects from real physical life into virtual worlds.

2. Description

Today, a large percentage of the monetary transfers and transactions that take place in virtual worlds are basically related to the buying and selling of objects. The creation of objects is considered a highly sophisticated task that only a small percentage of virtual world users are capable of performing. One would have to first design the object and then define it in the virtual world. Often times one feels that they need to be an artistic designer as well as have a commanding grasp of programming skills to program modules that would provide an object in the virtual world that is pleasing to the eye.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

As previously indicated, it can be very difficult to create objects in the virtual world, and only a small percentage of virtual world users are capable of moving from a mental description of an object to implementing the object in a virtual world. Embodiments of the present invention make object creation for virtual world objects accessible to a wide audience. Instead of users having to create objects using direct conversion from thought to virtual object, users may now go from thought to real world object with automatic translation to virtual object. This is accomplished by using a construction kit to construct a real world model of the object and intelligent sensors to sense the characteristics and structure of the real world model of the object in order to convey this information to a software module on a computing device. The software module will then transform this information into a virtual object for use in a virtual world, such as, but not limited to, Second Life. Thus, embodiments of the present invention create a bridge between the physical world and the virtual world by having the user create the object in the real world and have that real world object automatically transported into a virtual object.

Although the present invention is described in terms of creating virtual world objects for Second Life, the invention is not limited to Second Life virtual world objects. In fact, the invention may also be applied to the creation of virtual world objects for other virtual worlds as well.

Figure 1:
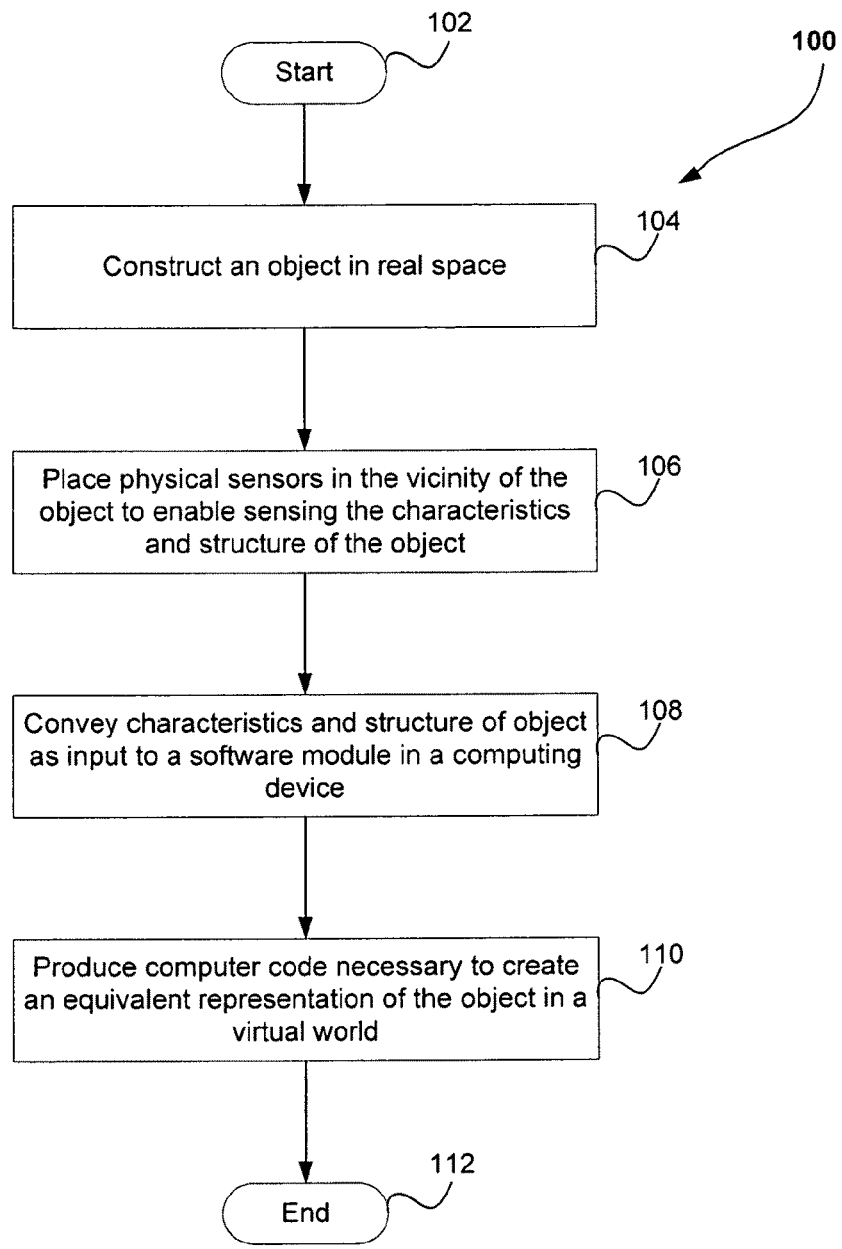
FIG. 1 is a flow diagram describing a method for enabling a user to create a real physical life object and transport the real physical life object into a virtual world object according to an embodiment of the present invention.

FIG. 1 is a flow diagram 100 describing a method for enabling a user to create a real physical life object and transport the real physical life object into a virtual world object according to an embodiment of the present invention. The invention is not limited to the embodiment described herein with respect to flow diagram 100. Rather, it will be apparent to persons skilled in the relevant art(s) after reading the teachings provided herein that other functional flow diagrams are within the scope of the invention. The process begins with block 102, where the process immediately proceeds to block 104.

In block 104, a user is enabled to construct an object in real space utilizing a construction kit. The construction kit may be similar in kind to a LEGO® set in that it contains a plurality of building blocks having the ability to interconnect with each other. The construction kit contains modular pieces resembling real-life objects. In one embodiment, the modular components are annotated for ease of recognition. For example, the modular components may have texture, patterns, corner markings with visual or infra-red paint, etc., for ease of recognition by other components of the invention.

Figure 2A:
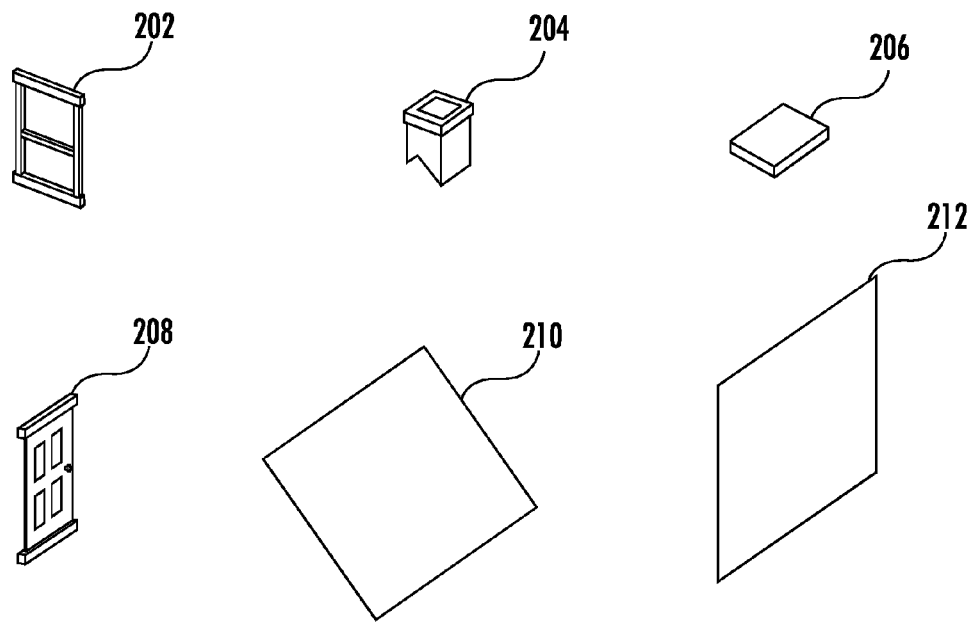
FIG. 2a illustrates exemplary modular pieces or components of a construction kit that may be used to build a house or some other type of building according to an embodiment of the present invention.
Figure 2B:
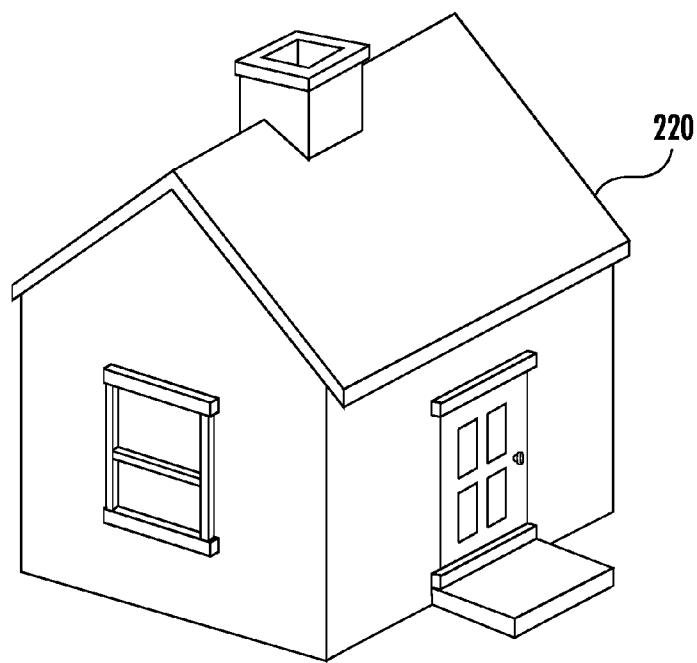
FIG. 2b illustrates an exemplary house built in the real world using modular components of a construction kit according to an embodiment of the present invention.

FIG. 2a illustrates exemplary modular pieces or components of a construction kit that may be used to build a house or some other type of building according to an embodiment of the present invention. The modular pieces include a window 202, a chimney 204, an entrance way 206, a door 208, a roof 210, and a brick wall 212. A user may assemble at least one or more of each of these modular components into an object, such as, for example, a house for use in a virtual world. FIG. 2b illustrates an exemplary house 220 built in the real world using modular pieces 202, 204, 206, 208, 210 and 212 of the construction kit according to an embodiment of the present invention.

In one embodiment, each modular component or piece may be predefined. For example, each modular component may be part of a library of modular component, with each modular component having a unique identification (ID). For example, in one embodiment, a modular component representing a square may be identified using a unique ID that begins with a "1" or an "S" followed by a unique serial number. In this instance, the first character of "1" or "S" may indicate that the modular component is a square. Modular components beginning with a "2" or "R" may represent a rectangular component. Modular components beginning with a "3" or "C" may represent a circular component. In other words, the first character of the unique ID is representative of the shape of the modular component and the remaining characters are representative of the unique serial number for the modular component.

In another embodiment, modular components may be identified according to shape, color, texture, and size, followed by a unique serial number. The first character of the unique ID may represent the shape of the modular component. The second character of the unique ID may represent the color of the modular component. The third character of the unique ID may represent the texture of the modular component. The fourth character of the unique ID may represent the size of the modular component. For example, a 5 inch red square with a smooth texture may be identified as SRS576942, where the first character represents the square shape, the second character represents the color red, the third character represents the texture smooth, the fourth character represents the size 5 inches, and the remaining characters represent the serial number 76942.

In yet another embodiment, the modular components may be represented using a unique address or serial number, such as, for example, 76942. The unique address or serial number may map to a component in a library that uniquely defines the characteristics of the modular components.

Returning to FIG. 1, in block 106, once the user has built an object in the real world, intelligent sensors are placed in the vicinity of the object in order to sense the different characteristics and structures of the object. The sensors convey this information to a software module executing on a computing device via a wireless communication channel. The number of sensors and the location of each sensor must be sufficient to discern the external shape of the structure for the object being sensed.

Figure 3:
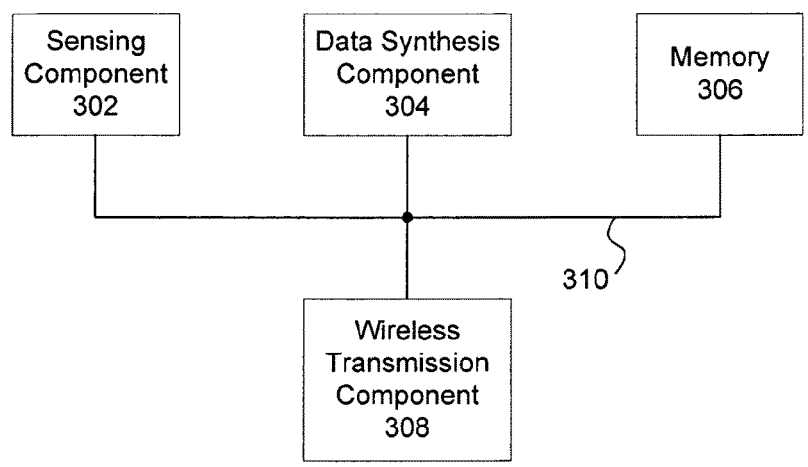
FIG. 3 illustrates an exemplary block diagram of a sensor according to an embodiment of the present invention.

The sensors may be visual (camera-based), infrared or sound-based, or based on any other sensing technologies that would enable the sensors to adequately sense the characteristics and structures of the objects to be conveyed. FIG. 3 illustrates an exemplary block diagram of a sensor 300 according to an embodiment of the present invention. Sensor 300 may include a physical sensing component 302, a data synthesis component 304, memory 306, a transmission component 308, and a communication bus 310. Physical sensing component 302, data synthesis component 304, memory 306, and transmission component 308 are coupled together via communication bus 310.

Physical sensing component 302 may be a visual sensor, a temperature sensor, a motion sensor, a sound-based sensor, a laser sensor, an infra-red sensor, a combination thereof, or any other sensor component having the ability to adequately sense the characteristics and structure of a real world object. Data synthesis component 304 may be a tiny processing component. In one embodiment, data synthesis component 304 may be a very simple processing component that receives the sensing data from physical sensing component 302 and queues the sensing data for transmission to another sensor 300 or a software module on another computing device via transmission component 306. In another embodiment, data synthesis component 304 may be a more sophisticated processing component, such as, but not limited to, an Atom processor manufactured by Intel Corporation or another tiny processor with computing resources and power. Memory may include non-volatile memory and/or volatile memory for storing data and may include an executable area for performing executable instructions pertaining to the characteristics and structure of the real world object. Transmission component 308 may use a wireless communication technology such as, but not limited to, Bluetooth, WiFi, or WiMax (Worldwide Interoperability for Microwave Access).

In one embodiment, one of sensors 300 acts as a base station, communicating with the other sensors 300 to receive all of the data from the other sensors 300 and communicating with a computing device to deliver or transmit the received data to the software module to be transformed into a virtual world object. In one embodiment, the base station sensor can take on a more substantial role of performing data synthesis before submitting the data to the software module. For example, the base station sensor may figure out that a wall has a window in it and instead of telling the software module "there is a window with dimensions X, Y, and Z, and a wall with dimensions X1, Y1, and Z1", it can say "there is a wall with dimensions X1, Y1, and Z1, and a window in the middle of the wall with dimensions X, Y, and Z." The base station sensor conveys the characteristics of each modular component and the structure of the real world object to the computing device.

Figure 4:
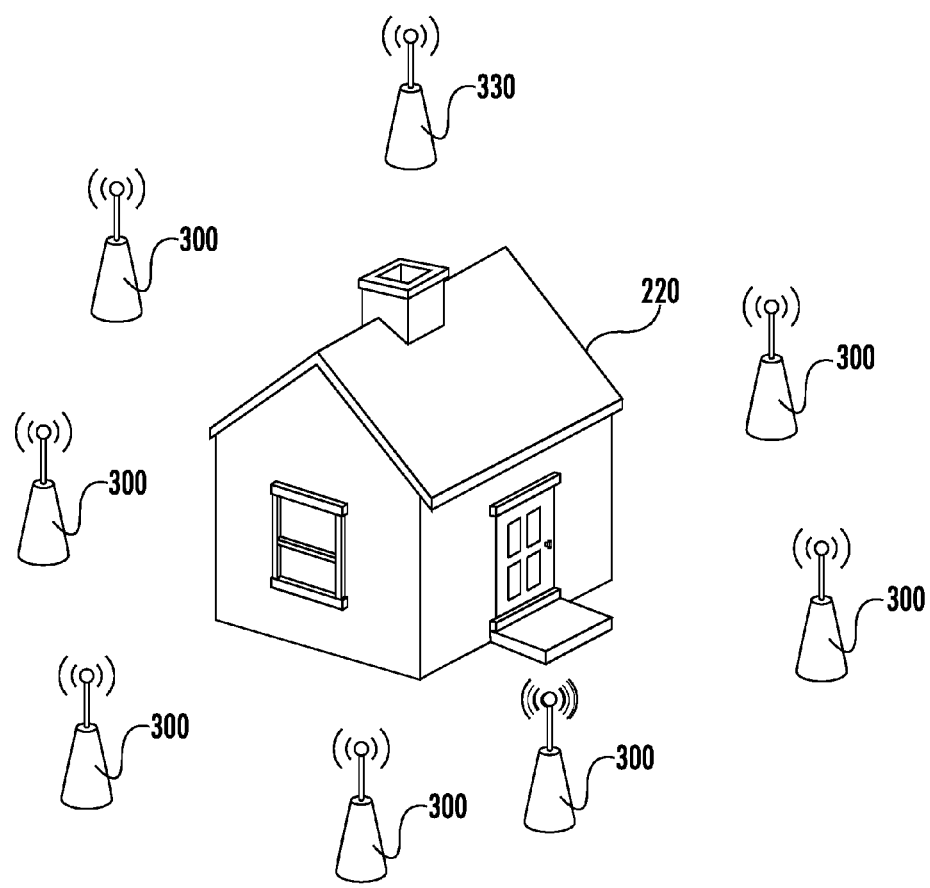
FIG. 4 illustrates an object built in the real world with intelligent sensors placed in the vicinity of the object to sense characteristics and structures of the object according to an embodiment of the present invention.

FIG. 4 illustrates an object built in the real world with intelligent sensors strategically placed in the vicinity of the object according to an embodiment of the present invention. As shown in FIG. 4, house 220 is surrounded by intelligent sensors 300. Intelligent sensors 300 are used to sense the different characteristics and structures of house 220 based on each modular component 202-212 used to build house 220. A base station sensor 330 is shown as well. Base station sensor 330 collects the data from intelligent sensors 300 and conveys this data to the software module to enable an instantiation of an equivalent virtual object.

Returning to FIG. 1, in block 108, the data collected by the base station sensor 330 is received as input to a software module via the computing device. The process then proceeds to block 110.

In block 110, the software module, after receiving the real world object data as input, is executed to produce the code necessary to create an equivalent representation of a virtual world object for the real world object. The type of code generated is dependent upon the virtual world in which the object is to be placed. In one embodiment, a mapping process is used to obtain the code. The virtual world for which the object is to be transformed into is selected. Each component from the real world object is mapped to a corresponding component in a pre-defined library of the selected virtual world to obtain the code for the virtual world object. In an embodiment in which images of the real world object are taken, the images are mapped to images on pre-defined objects of the selected virtual world to obtain the code for the virtual world object. In yet another embodiment where the actual physical object is recognized by the base station sensor, the actual object is conveyed and mapped to a corresponding object or primitive in the virtual world of choice.

In one embodiment, the code produced, when instantiated, results in an equivalent representation of a virtual object in a virtual world, such as, for example, Second Life. In other words, the code when executed creates a Second Life "prims" or primitive in a correct arrangement to represent the real world object. In another embodiment, the code may result in KML descriptions of the object. KML is a file format based on the XML standard that is used to display graphical data. Other code formats may also be generated, depending on the virtual world in which the object is to be used.

Figure 5:
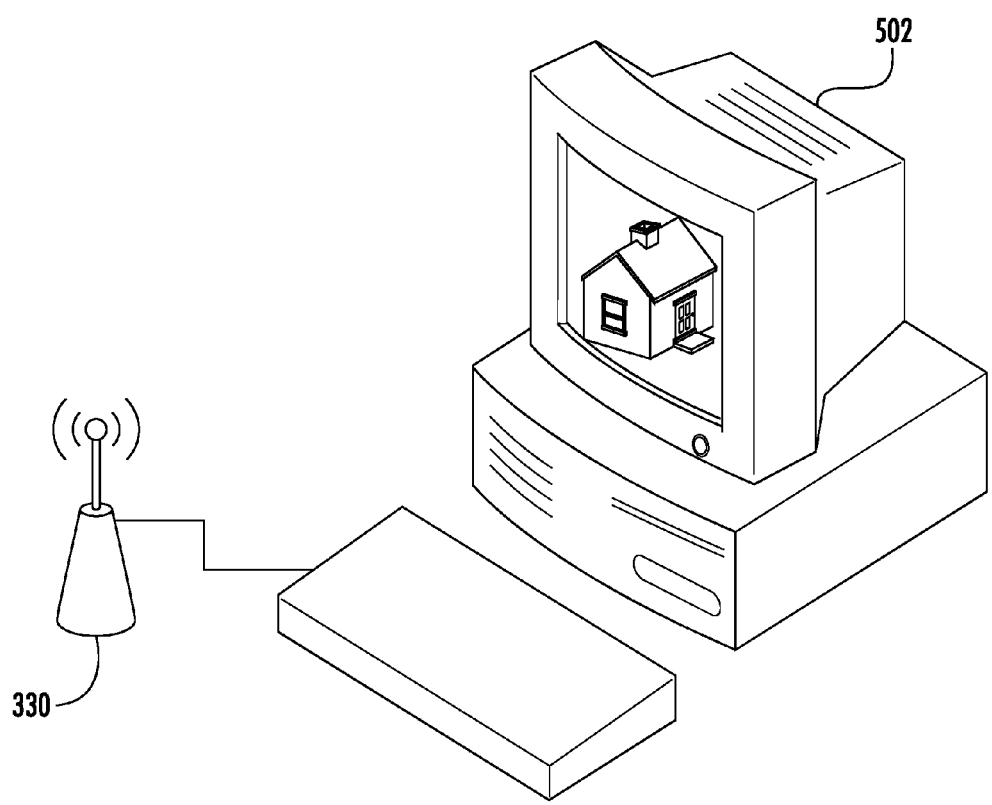
FIG. 5 is a diagram illustrating a base station sensor communicating with a computing device to transmit real world object data to the computing device according to an embodiment of the present invention.

FIG. 5 is a diagram illustrating a base station sensor communicating with a computing device to transmit real world object data to the computing device according to an embodiment of the present invention. FIG. 5 shows base station sensor 330 wirelessly coupled to computing device 502. Computing device 502 shows a display of an equivalent virtual world object for the real world object received from base station sensor 330.

In yet another embodiment, modular components may include an intelligent sensor embedded in the modular component. In this instance, the intelligent sensor may comprise information defining the characteristics and structure of the modular component. These sensors are described above with reference to FIG. 3, and may also be defined as self-organizing sensors. Thus, each modular component with an embedded sensor has knowledge of its characteristics and structure and, when connected together, may perform sense-making using pattern recognition or simple heuristics on a library of relative locations and shapes to detect composite shapes being formed.

Figure 6A:
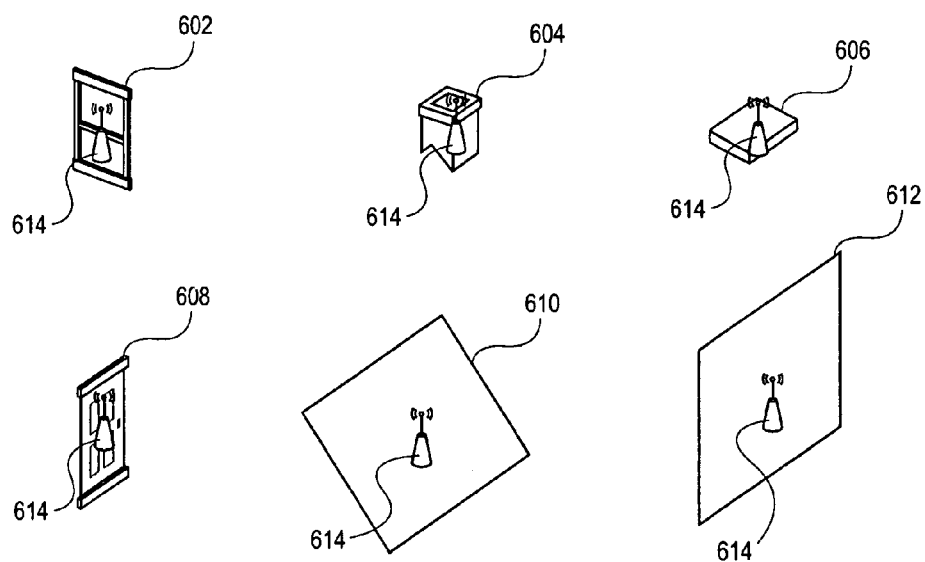
FIG. 6a is a diagram illustrating modular physical objects having self-organizing sensors embedded according to an embodiment of the present invention.
Figure 6B:
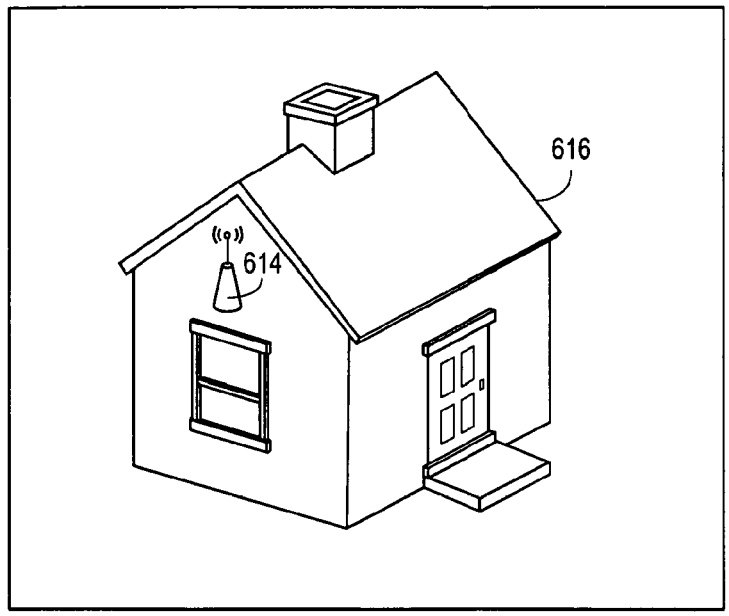
FIG. 6b illustrates connected modular components self-organizing to detect the assemblage of a house.
Figure 6B:
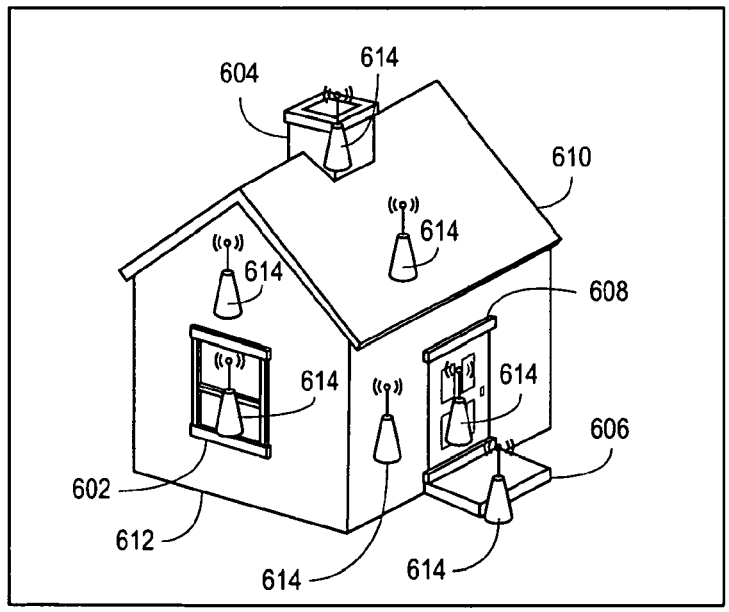

FIG. 6a illustrates modular components having intelligent sensors embedded according to an embodiment of the present invention. FIG. 6a shows a window 602, a chimney 604, an entrance way 606, a door 608, a roof 610, and a brick wall 612. Each of modular components 602, 604, 606, 608, 610 and 612 include an embedded intelligent sensor 614. As previously indicated, intelligent sensor 614 provides each modular component 602, 604, 606, 608, 610, and 612 with knowledge of its characteristics and structure. As these modular components are connected, they begin to self-organize into a single object. For example, FIG. 6b shows modular components 602-612, when connected, self-organizing to detect the assemblage of a house 616.

Figure 6C:
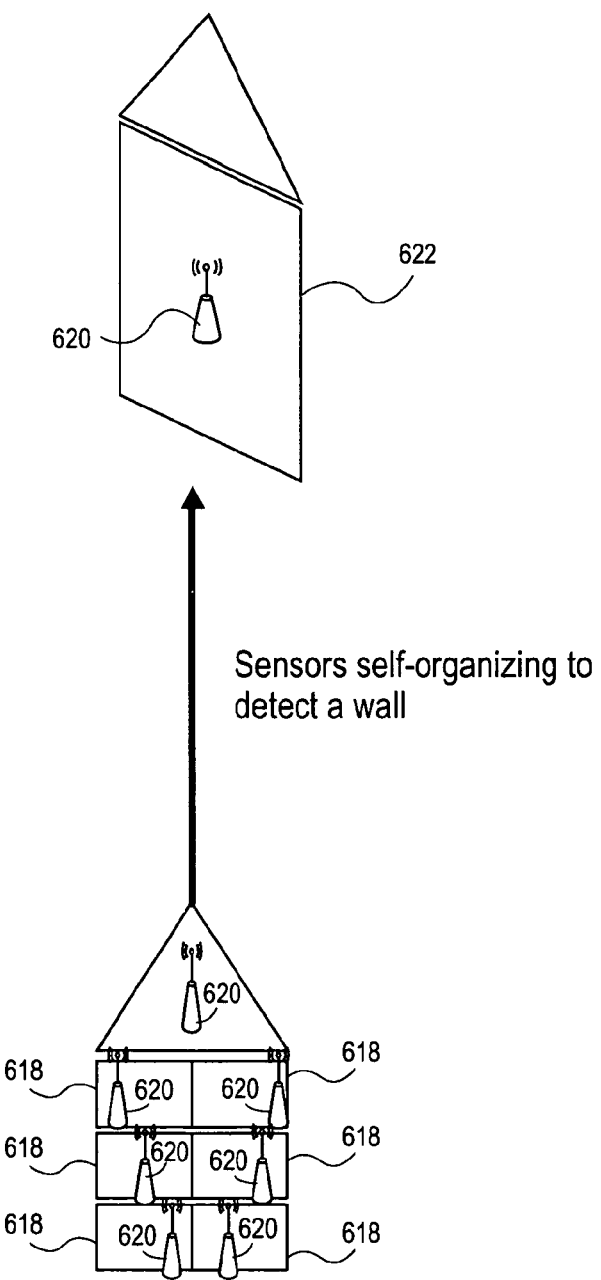
FIG. 6c illustrates connected modular components self-organizing to detect the assemblage of a wall.

FIG. 6c illustrates modular components 618 self-organizing to detect the assemblage of a wall. In FIG. 6c, a plurality of bricks 618 are connected. Each brick 618 includes an embedded intelligent sensor 620. The embedded intelligent sensors are described above with reference to FIG. 3. As the modular components having self-organizing sensors communicate their characteristics, structure, location, and the areas in which they interconnect, they begin to detect the bigger picture as to what they represent as a whole. As can be seen in FIG. 6c, bricks 618, when assembled, represent a wall 622.

Figure 7A:
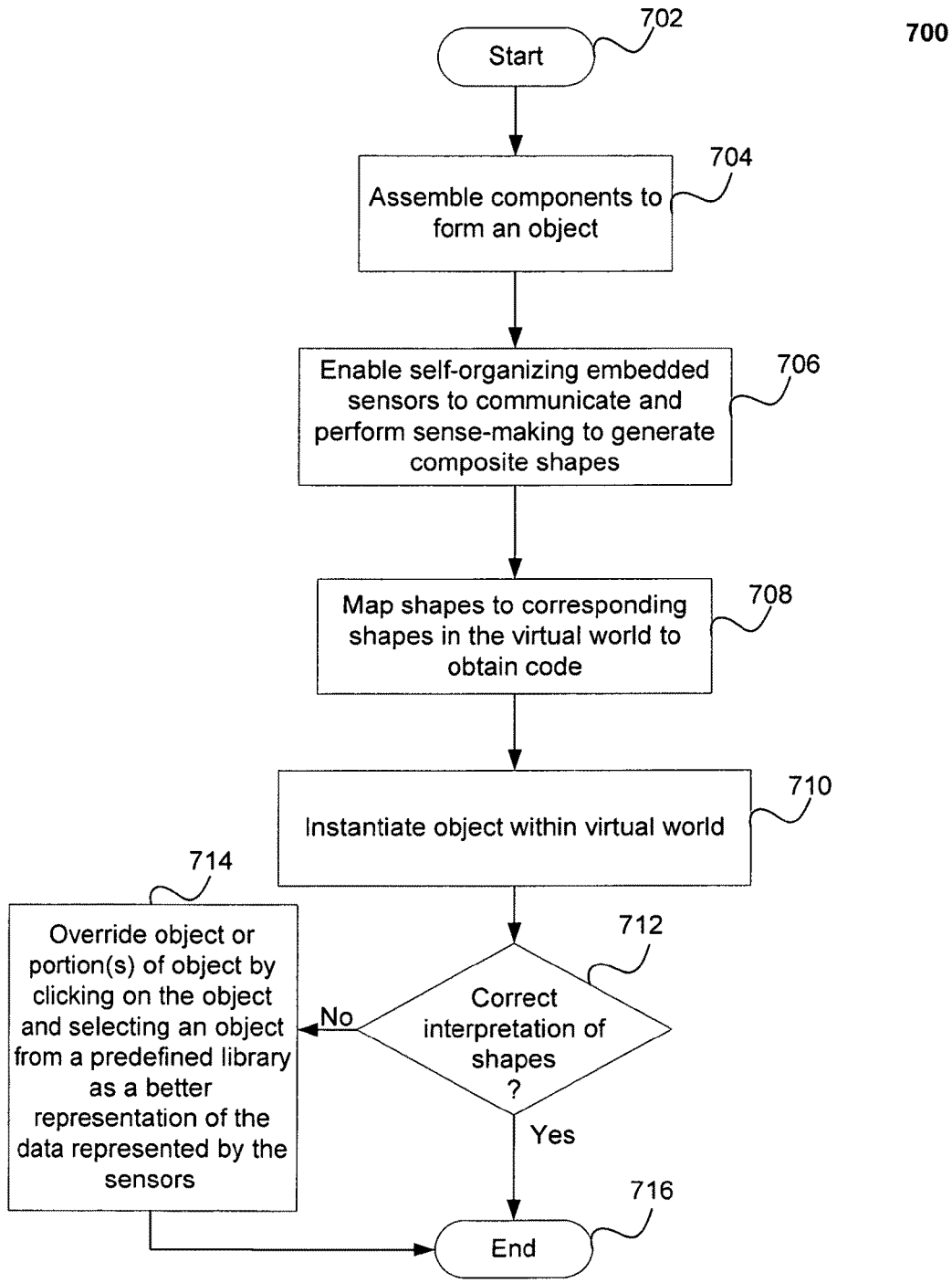
FIG. 7a is a flow diagram describing an exemplary method for constructing virtual objects using self-organizing sensors embedded in modular components according to an embodiment of the present invention.

FIG. 7a is a flow diagram 700 describing an exemplary method for constructing virtual objects using self-organizing sensors embedded in modular components according to an embodiment of the present invention. The invention is not limited to the embodiment described herein with respect to flow diagram 700. Rather, it will be apparent to persons skilled in the relevant art(s) after reading the teachings provided herein that other functional flow diagrams are within the scope of the invention. The process begins with block 702, where the process immediately proceeds to block 704.

In block 704, modular components having embedded self-organizing sensors are assembled in the real world by a user to form an object. The process then proceeds to block 706.

In block 706, the self-organizing embedded sensors enable the modular components, when connected, to communicate amongst themselves such that they exchange information about their respective characteristics (shape, color, texture, size, etc.), structures, locations, and the areas in which they inter-connect in order to convey a bigger picture as to what they represent as a whole. In other words, sense-making using pattern recognition or simple heuristics on a library of relative locations and shapes is performed. The sense-making allows the detection of common composite shapes, such as, for example, a wall, a house, etc., and textures, such as, for example, brick, shingle, carpet, color of paint, etc. The process then proceeds to block 708.

In block 708, once the common composite shapes have been determined through sense-making, the common composite shapes are mapped to corresponding composite shapes in the virtual world of choice to obtain the corresponding code for the object. The process then proceeds to block 710.

In block 710, the object is instantiated within the virtual world and presented to the user. The process then proceeds to decision block 712.

In decision block 712, it is determined whether the interpretation of the virtual object is equivalent to the real world object. If the user finds the virtual object equivalent unsatisfactory (e.g., interpreted a boat as a Christmas tree), the process proceeds to block 714.

In block 714, the user may override the virtual object, or at least a part of the virtual object, by clicking on the object. Clicking on the object allows the user the option of browsing a pre-defined library to select another virtual world object that may be a better representation. The selection of another object as a better representation is noted and used as a learning mechanism for associating the data presented by the sensors with the object selected by the user from the pre-defined library. Thus, the next time the user builds the same object in the real world, the virtual object selected by the user from the pre-defined library will be instantiated.

Returning to decision block 712, if it is determined that the interpretation of the virtual object is equivalent to the real world object, the process proceeds to block 716 where the process ends.

Figure 7B:
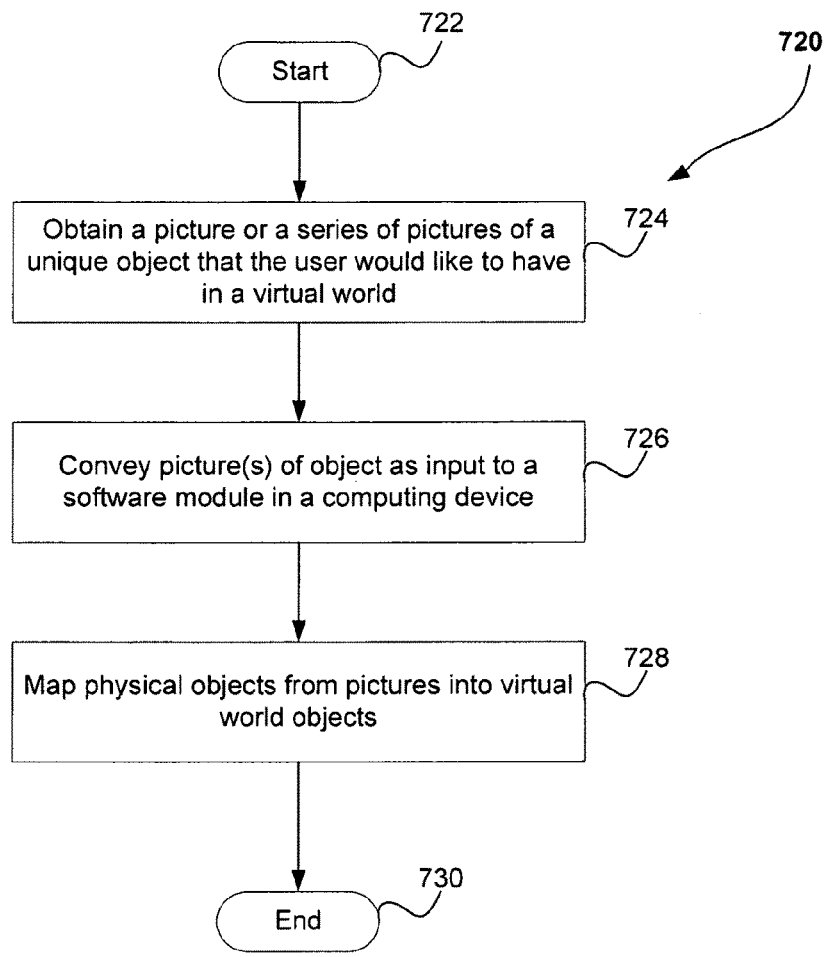
FIG. 7b is a flow diagram describing a method for enabling a user to create virtual world objects from a photograph or series of photographs taken of an object in the real world with the use of a camera according to an embodiment of the present invention.

In an alternative embodiment, a user may take a picture or a series of pictures of an object that the user would like to see in a virtual world and have that object transformed into an object in the virtual world. In one embodiment, the user may capture the picture(s) using a camera. In another embodiment, the user may obtain the picture(s) from a book, magazine, etc. FIG. 7b is a flow diagram 720 describing a method for enabling a user to create virtual world objects from a photograph or series of photographs of an object in the real world according to an embodiment of the present invention. The invention is not limited to the embodiment described herein with respect to flow diagram 720. Rather, it will be apparent to persons skilled in the relevant art(s) after reading the teachings provided herein that other functional flow diagrams are within the scope of the invention. The process begins with block 722, where the process immediately proceeds to block 724.

In block 724, the user may obtain a photograph or a series of photographs of an object that the user would like to see in a virtual world. In one embodiment, the user may obtain the object by personally taking a picture of the object or a series of pictures of the object. For example, a user may be sightseeing at a museum or shopping at a mall and see something unique that they would like to have in their virtual world. The user may then take a picture of the object or a series of pictures of the object from different angles. In one embodiment, the pictures may be taken at a low resolution, allowing the user a great deal of flexibility in the type of camera used to take the picture(s). For example, the user may use a low-quality camera embedded in a cell phone. The user is not limited to using a low resolution camera, and may use a high resolution camera as well.

In another embodiment, the user may find a photograph of an object that they would like to have in a virtual world in a magazine, a book, etc. The process then proceeds to block 726.

In block 726, the pictures obtained from a camera are conveyed as input to a software module on the computing device. This may be done via a wireless connection or a wired connection in a manner well known to those skilled in the relevant art(s). In an embodiment in which the pictures are obtained from books, magazines, etc., the pictures can be scanned into the computing device to be used as input to the software module. The process then proceeds to block 728.

In block 728, the pictures are reconstructed using the software module to create a virtual object. The software module uses graphical and visualization techniques coupled with image and object recognition technologies to map the physical object into an equivalent/similar object in the virtual world. In an alternative embodiment, a library of pre-defined objects may be used to map the real world objects into objects closely resembling those in the library of virtual objects. The process then proceeds to block 730, where the process ends.

Figure 8:
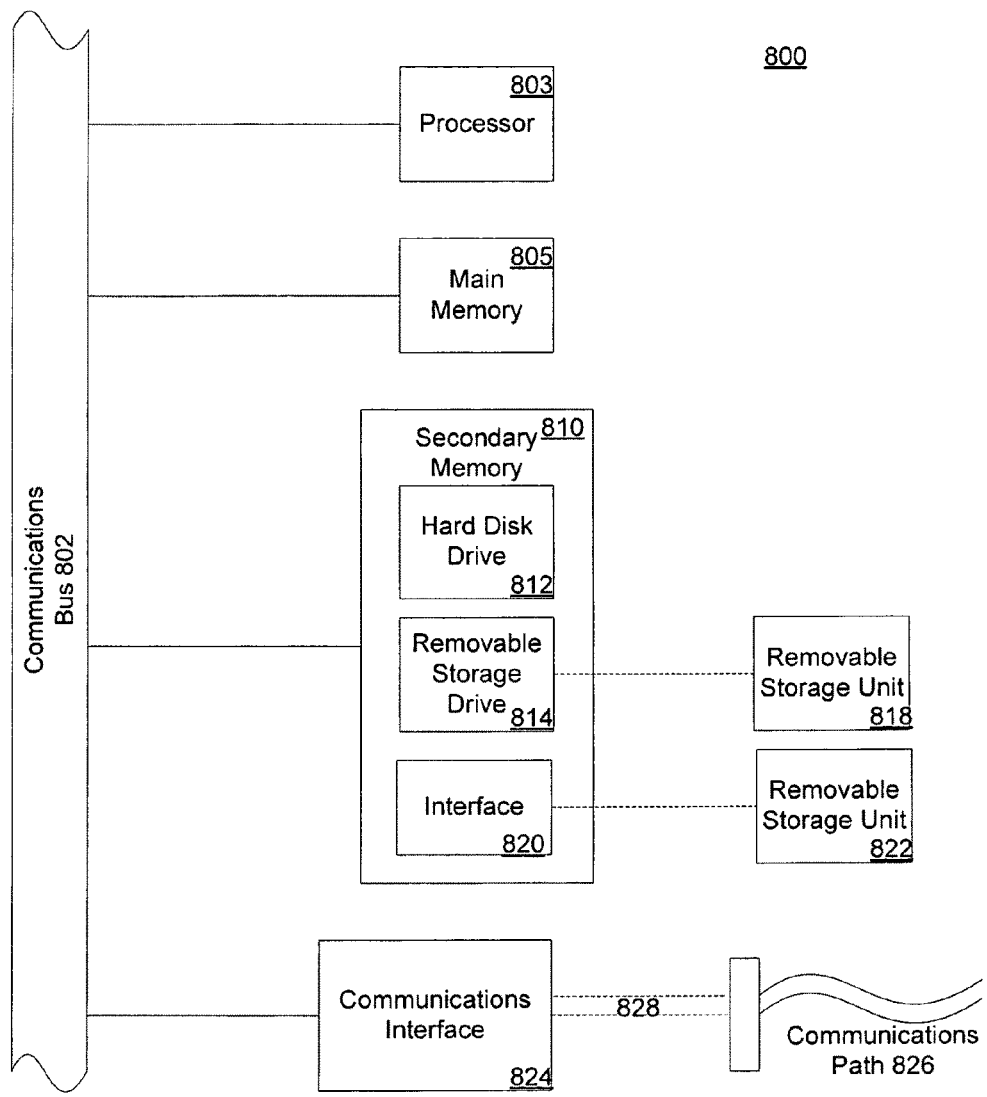
FIG. 8 is a block diagram illustrating an exemplary computer device in which certain aspects of embodiments of the present invention may be implemented.

Embodiments of the present invention may be implemented using hardware, software, or a combination thereof and may be implemented in one or more computer systems or other processing systems. In fact, in one embodiment, the invention is directed toward one or more computer systems capable of carrying out the functionality described here. An example implementation of a computer system 800 is shown in FIG. 8. Various embodiments are described in terms of this exemplary computer system 800. After reading this description, it will be apparent to a person skilled in the relevant art how to implement the invention using other computer systems and/or computer architectures.

Computer system 800 includes one or more processors, such as processor 803. Processor 803 is connected to a communication bus 802. Computer system 800 also includes a main memory 805, preferably random access memory (RAM), and may also include a secondary memory 810. Secondary memory 810 may include, for example, a hard disk drive 812 and/or a removable storage drive 814, representing a floppy disk drive, a magnetic tape drive, an optical disk drive, etc. Removable storage drive 814 reads from and/or writes to a removable storage unit 818 in a well-known manner. Removable storage unit 818 represents a floppy disk, magnetic tape, optical disk, etc., which is read by and written to by removable storage drive 814. As will be appreciated, removable storage unit 818 includes a computer usable storage medium having stored therein computer software and/or data.

In alternative embodiments, secondary memory 810 may include other similar means for allowing computer programs or other instructions to be loaded into computer system 800. Such means may include, for example, a removable storage unit 822 and an interface 820. Examples of such may include a program cartridge and cartridge interface (such as that found in video game devices), a removable memory chip (such as an EPROM (erasable programmable read-only memory) or PROM (programmable read-only memory)) and associated socket, and other removable storage units 822 and interfaces 820 which allow software and data to be transferred from removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a PCMCIA (personal computer memory card international association) slot and card, a wireless LAN (local area network) interface, etc. Software and data transferred via communications interface 824 are in the form of signals 828 which may be electronic, electromagnetic, optical or other signals capable of being received by communications interface 824. These signals 828 are provided to communications interface 824 via a communications path (i.e., channel) 826. Channel 826 carries signals 828 and may be implemented using wire or cable, fiber optics, a phone line, a cellular phone link, a wireless link, and other communications channels.

In this document, the term "computer program product" refers to removable storage units 818, 822, and signals 828. These computer program products are means for providing software to computer system 800. Embodiments of the invention are directed to such computer program products.

Computer programs (also called computer control logic) are stored in main memory 805, and/or secondary memory 810 and/or in computer program products. Computer programs may also be received via communications interface 824. Such computer programs, when executed, enable computer system 800 to perform the features of the present invention as discussed herein. In particular, the computer programs, when executed, enable processor 803 to perform the features of embodiments of the present invention. Accordingly, such computer programs represent controllers of computer system 800.

In an embodiment where the invention is implemented using software, the software may be stored in a computer program product and loaded into computer system 800 using removable storage drive 814, hard drive 812 or communications interface 824. The control logic (software), when executed by processor 803, causes processor 803 to perform one or more of the functions of the invention as described herein.

In another embodiment, the invention is implemented primarily in hardware using, for example, hardware components such as application specific integrated circuits (ASICs). Implementation of hardware state machine(s) so as to perform the functions described herein will be apparent to persons skilled in the relevant art(s). In yet another embodiment, the invention is implemented using a combination of both hardware and software.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A method for converting a real-world object composed of a plurality of interconnected modular components into a virtual-world object, the method comprising:

sensing, by a base station sensor coupled to a base station computing device, a first unique identifier annotated on an external surface of a first modular component and a second unique identifier annotated on an external surface of a second module component interconnected with the first modular component to form a first portion of the real-world object, wherein the base station sensor is external to the real-world object;

receiving, by the base station computing device and from a plurality of remote sensors different from the base station sensor, unique identifiers sensed by the plurality of remote sensors for other interconnected modular components of the plurality of interconnected modular components different from the first and second modular components, wherein the other interconnected module components form a second portion of the real-world object different from the first portion and wherein each remote sensor of the plurality of remote sensors is external to the real-world object;

determining, by the base station computing device, (i) characteristics of the first and second modular components based on the unique identifiers annotated on the first and second modular components and (ii) characteristics of the other interconnected modular components based on the unique identifies annotated on the other interconnected module components;

synthesizing, by the base station computing device, the determined characteristics of the first and second modular components to identify a first structure of the real-world object from a database of structures stored on the base station computing device based on the determined characteristics, the first structure including a plurality of characteristics associated therewith, wherein the plurality of characteristics includes the determined characteristics and at least one additional characteristic that identifies a location of the second module component relative to the first modular component;

synthesizing, by the base station computing device, the determined characteristics of the other interconnected modular components to identify a second structure of the real-world object from the database of structures based on the determined characteristics of the other interconnected modular components and the identification of the first structure, wherein the second structure includes the first structure; and transmitting, from the base station computing device and to a remote computing device, the second structure for translation into a virtual-world representation of the real-world object.

2. The method of claim 1, wherein receiving the unique identifiers comprises receiving the first unique identifier sensed by a remote sensor of the plurality of remote sensors.

3. The method of claim 1, wherein the real-world object consists of the first portion and the second portion.

4. The method of claim 1, further comprising sensing, by the base station sensor, unique identifiers for additional interconnected module components of the plurality of interconnected modular components different from the first and second modular components and the other interconnected modular components, wherein the additional interconnected modular components form a third portion of the real-world object different from the first portion and the second portion.

5. The method of claim 4, wherein the real-world object consists of the first portion, the second portion, and the third portion.

6. The method of claim 1, wherein the database of structures stored on the base station computing device comprises a library of structures identified based on corresponding unique identifiers of the modular components and associated characteristics of each of the modular components.

7. The method of claim 6, wherein synthesizing the determined characteristics of the first and second modular components comprises identifying, based on the database of structures, a third modular component having the plurality of characteristics of the first structure.

8. The method of claim 1, wherein transmitting the second structure to the remote computing device comprises transmitting the second structure for automatic translation, by the remote computing device, of the second structure into code that, when instantiated in a virtual world, results in the virtual-world representation of the real-world object.

9. The method of claim 8, wherein transmitting the second structure for automatic translation comprises transmitting the second structure for automatic translation of the second structure into the code by mapping the second structure to the virtual-world representation based on a pre-defined library of virtual-world components.

10. The method of claim 1, wherein the real-world object comprises an object constructed by a user having a construction kit including the plurality of interconnected modular components that when connected together form the real-world object.

11. One or more non-transitory machine-readable storage media comprising a plurality of instructions stored thereon that, in response to execution by a base station computing device, cause the base station computing device to:

sense, by a base station sensor coupled to the base station computing device, a first unique identifier annotated on an external surface of a first modular component and a second unique identifier annotated on an external surface of a second module component interconnected with the first modular component to form a first portion of a real-world object, wherein the real-world object is composed of a plurality of interconnected modular components and the base station sensor is external to the real-world object;

receive, from a plurality of remote sensors different from the base station sensor, unique identifiers sensed by the plurality of remote sensors for other interconnected modular components of the plurality of interconnected modular components different from the first and second modular components, wherein the other interconnected module components form a second portion of the real-world object different from the first portion and wherein each remote sensor of the plurality of remote sensors is external to the real-world object;

determine (i) characteristics of the first and second modular components based on the unique identifiers annotated on the first and second modular components and (ii) characteristics of the other interconnected modular components based on the unique identifies annotated on the other interconnected module components;

synthesize the determined characteristics of the first and second modular components to identify a first structure of the real-world object from a database of structures stored on the base station computing device based on the determined characteristics, the first structure including a plurality of characteristics associated therewith, wherein the plurality of characteristics includes the determined characteristics and at least one additional characteristic that identifies a location of the second module component relative to the first modular component;

synthesize the determined characteristics of the other interconnected modular components to identify a second structure of the real-world object from the database of structures based on the determined characteristics of the other interconnected modular components and the identification of the first structure, wherein the second structure includes the first structure; and transmit, to a remote computing device, the second structure for translation into a virtual-world representation of the real-world object.

12. The one or more non-transitory machine-readable storage media of claim 11, wherein to receive the unique identifiers comprises to receive the first unique identifier sensed by a remote sensor of the plurality of remote sensors.

13. The one or more non-transitory machine-readable storage media of claim 11, wherein the real-world object consists of the first portion and the second portion.

14. The one or more non-transitory machine-readable storage media of claim 11, wherein the plurality of instructions further cause the base station computing device to sense, by the base station sensor, unique identifiers for additional interconnected module components of the plurality of interconnected modular components different from the first and second modular components and the other interconnected modular components, wherein the additional interconnected modular components form a third portion of the real-world object different from the first portion and the second portion.

15. The one or more non-transitory machine-readable storage media of claim 14, wherein the real-world object consists of the first portion, the second portion, and the third portion.

16. The one or more non-transitory machine-readable storage media of claim 11, wherein the database of structures stored on the base station computing device comprises a library of structures identified based on corresponding unique identifiers of the modular components and associated characteristics of each of the modular components.

17. The one or more non-transitory machine-readable storage media of claim 16, wherein to synthesize the determined characteristics of the first and second modular components comprises to identify, based on the database of structures, a third modular component having the plurality of characteristics of the first structure.

18. The one or more non-transitory machine-readable storage media of claim 11, wherein to transmit the second structure to the remote computing device comprises to transmit the second structure for automatic translation, by the remote computing device, of the second structure into code that, when instantiated in a virtual world, results in the virtual-world representation of the real-world object.

19. The one or more non-transitory machine-readable storage media of claim 18, wherein to transmit the second structure for automatic translation comprises to transmit the second structure for automatic translation of the second structure into the code by mapping the second structure to the virtual-world representation based on a pre-defined library of virtual-world components.

20. The one or more non-transitory machine-readable storage media of claim 11, wherein the real-world object comprises an object constructed by a user having a construction kit including the plurality of interconnected modular components that when connected together form the real-world object.

21. A base station computing device for converting a real-world object composed of a plurality of interconnected modular components into a virtual-world object, the base station computing device comprising:

a memory;

a sensing component including one or more sensors to sense a first unique identifier annotated on an external surface of a first modular component and a second unique identifier annotated on an external surface of a second module component interconnected with the first modular component to form a first portion of the real-world object;

a wireless transmission component to receive, from a plurality of remote sensors different from the one or more sensors, unique identifiers sensed by the plurality of remote sensors for other interconnected modular components of the plurality of interconnected modular components different from the first and second modular components, wherein the other interconnected module components form a second portion of the real-world object different from the first portion and wherein each remote sensor of the plurality of remote sensors is external to the real-world object; and a data synthesis component to (i) determine characteristics of the first and second modular components based on the unique identifiers annotated on the first and second modular components, (ii) determine characteristics of the other interconnected modular components based on the unique identifies annotated on the other interconnected module components, (iii) synthesize the determined characteristics of the first and second modular components to identify a first structure of the real-world object from a database of structures stored on the memory based on the determined characteristics, the first structure including a plurality of characteristics associated therewith, wherein the plurality of characteristics includes the determined characteristics and at least one additional characteristic that identifies a location of the second module component relative to the first modular component, and (iv) synthesize the determined characteristics of the other interconnected modular components to identify a second structure of the real-world object from the database of structures based on the determined characteristics of the other interconnected modular components and the identification of the first structure, wherein the second structure includes the first structure, wherein the wireless transmission component is further to transmit, to a remote computing device, the second structure for translation into a virtual-world representation of the real-world object.

22. The base station computing device of claim 21, wherein to receive the unique identifiers comprises to receive the first unique identifier sensed by a remote sensor of the plurality of remote sensors.

23. The base station computing device of claim 21, wherein the real-world object consists of the first portion and the second portion.

24. The base station computing device of claim 21, wherein the sensing component is further to sense unique identifiers for additional interconnected module components of the plurality of interconnected modular components different from the first and second modular components and the other interconnected modular components, wherein the additional interconnected modular components form a third portion of the real-world object different from the first portion and the second portion.

25. The base station computing device of claim 24, wherein the real-world object consists of the first portion, the second portion, and the third portion.

26. The base station computing device of claim 21, wherein the database of structures stored on the memory comprises a library of structures identified based on corresponding unique identifiers of the modular components and associated characteristics of each of the modular components.

27. The base station computing device of claim 26, wherein to synthesize the determined characteristics of the first and second modular components comprises to identify, based on the database of structures, a third modular component having the plurality of characteristics of the first structure.

28. The base station computing device of claim 21, wherein to transmit the second structure to the remote computing device comprises to transmit the second structure for automatic translation, by the remote computing device, of the second structure into code that, when instantiated in a virtual world, results in the virtual-world representation of the real-world object.

29. The base station computing device of claim 28, wherein to transmit the second structure for automatic translation comprises to transmit the second structure for automatic translation of the second structure into the code by mapping the second structure to the virtual-world representation based on a pre-defined library of virtual-world components.

30. The base station computing device of claim 21, wherein the real-world object comprises an object constructed by a user having a construction kit including the plurality of interconnected modular components that when connected together form the real-world object.

* * * * *